United States Patent [19]
Smith

[11] 4,200,322
[45] Apr. 29, 1980

[54] RETRIEVING DEVICE

[76] Inventor: Raymond A. Smith, Rte. 8, Box 191, Lexington, N.C. 27292

[21] Appl. No.: 953,002

[22] Filed: Oct. 20, 1978

[51] Int. Cl.² .............................................. B25J 1/00
[52] U.S. Cl. ............................................... 294/19 R
[58] Field of Search ................. 294/19 R, 8.5, 11, 22, 294/23, 50.8, 50.9, 104, 115

[56] References Cited
U.S. PATENT DOCUMENTS

| | | | |
|---|---|---|---|
| 2,346,038 | 4/1944 | Mason | 294/19 R |
| 3,105,715 | 10/1963 | Happ | 294/19 R |
| 3,146,015 | 8/1964 | Roberge | 294/19 R |

Primary Examiner—James B. Marbert

[57] ABSTRACT

This invention consists of a device for retrieving objects from the floor or otherwise that have been dropped or are out of the reach of persons suffering from injuries or infirmaries which prevent bending or stooping. Persons recovering from back surgery may find this device extremely beneficial in picking up items such as sheets of paper, pencils, cans or other materials such as are below or otherwise out of their reach while they remain in a normal standing position.

3 Claims, 5 Drawing Figures

RETRIEVING DEVICE

BACKGROUND AND OBJECTIVES OF THE PRESENT INVENTION

Various prior art devices are known which grip or clamp objects for retrieval purposes and most of the present devices are for large objects and cannot retrieve a single sheet of paper or other small objects. Also, several of the present available devices are cumbersome and are inconvenient or impractial for use to assist the infirmed as they walk about.

With this background in mind the present invention was developed and one of its objectives is to provide a device to assist the aged or injured in walking while providing a convenient device for retrieving various objects.

Another objective of the present invention is to provide a device for retrieving objects which is relatively simple in construction and inexpensive to manufacture. construction and inexpensive to manufacture.

Yet another objective of the present invention is to provide a device for retrieving objects which includes a pivotable arm member having a resilient lip for grasping small or thin materials.

It is still yet another objective of the present invention to provide a retrieving device which includes a pivotable arm member having magnetic means.

Other objectives and advantages of the present invention will become apparent in accordance with the description and examples shown hereafter.

SUMMARY OF THE INVENTION AND DESCRIPTION OF THE DRAWINGS

The present invention consists of a retrieving device which may be incorporated wih a cane, crutch or other walking aids which will allow the user to retrieve objects, for example from the floor without having to bend or stoop. A finger engaging means is positioned near the handle of the walking aid which, when pulled, causes he rotation of an arm member which swings outwardly and downwardly to grasp between it and the terminal end of the walking aid, the object which is desired. By lifting the cane the object can then be grasped by the user. Thereafter, the finger gripping means can then be pushed downward, which will release the object and will cause the arm member to swing to its upright position, out of the way for the walking aid to again ready for use to retrieve other objects or be of assistance in providing mobility to the user.

FIG. 1 in a side view of the retrieving device.

Figure 1:
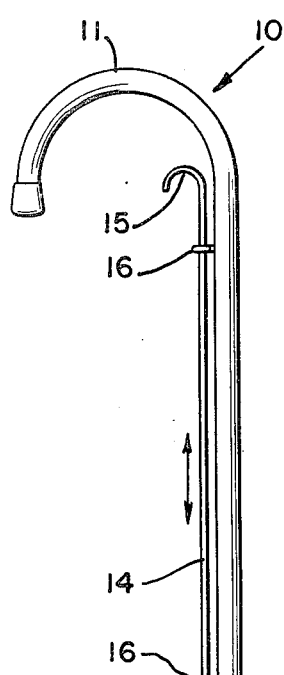

Turning now to the drawings, FIG. 1 demonstrates the preferred embodiment of the present invention which includes a walking aid or cane 10 having a handle 11 and an elongated shaft 12. The lower terminal end of cane 10 includes a frictional engaging means 13 which may be constructed of rubber or other materials having "non-skid" properties. Pull rod 14 is pictured on the inside of shaft 12 and incudes at the upper end a u-shaped finger engaging means 15. Pull rod 14 is slidably mounted to cane shaft 12 by eyelet or guiding means 16 which prevents pull rod 14 from bending or bowing during use. Joined to the lower end of pull rod 14 is linkage means 17 which pivots around linkage pin 18. Linkage means 17 also, while pivoting, slides or "see-saws" as allowed by slide 19. Attached to linkage means 17 is pivotable arm member 20.

As shown, arm member 20 pivots approximately 180° from an open or dormant upper position to a closed or downward, engaging position. As shown, arm member 20 includes a resilient lip 21 which contacts frictional engaging means 13 in the downwardmost position of arm member 20. Also shown on arm member 20 is arcuate gripping means 22 which may be constructed or rubber or other materials which are of a "non-slip" nature.

Figure 2:
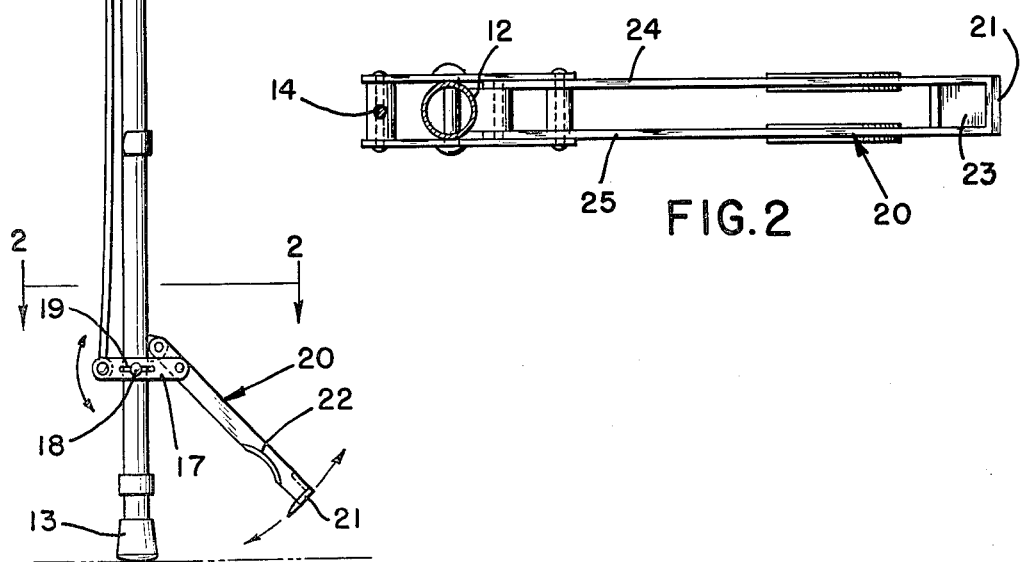
FIG 2 is a top cross-sectional view taken along lines 2—2 of FIG. 1.

In FIG. 2, a top cross-sectional view is shown along lines 2–2 in which arm member 20 is shown extended outwardly, perpendicular to cane shaft 12. Magnetic means 23 is shown in FIG. 2 between side braces 24 and 25.

Figure 3:
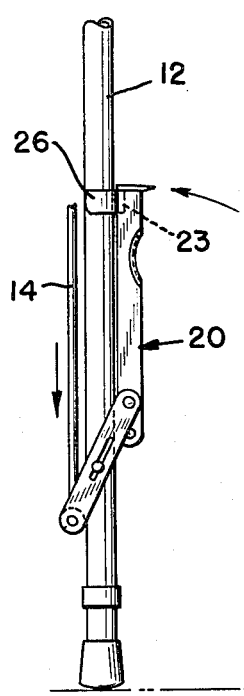
FIG. 3 is side elevation view of the gripping section in open position.

FIG. 3 shows arm member 20 in its upright or dormant position whereby magnetic means 23 (shown in outline form) is attached to bracket means 26 which may be of soft iron or other suitable magnetically attractive material.

Figure 4:
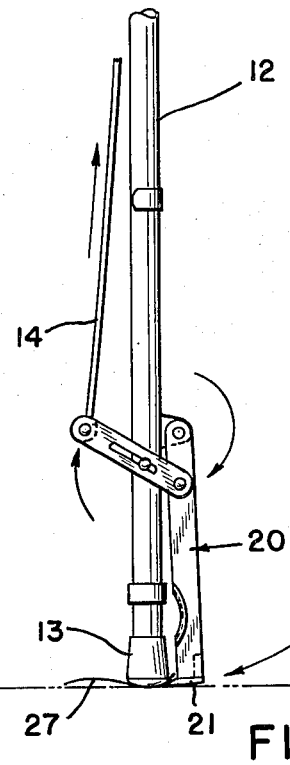
FIG. 4 is a side elevation of the gripping section in closed position.

As shown in FIG. 4, as pull rod 14 is urged upwardly arm member 2o swings downwardly and resilient lip 21 can engage a thin sheet of paper 27, for example. As shown, lip 21 will contact the underside of frictional engaging means 13 to form overlapping contact therewith.

Figure 5:
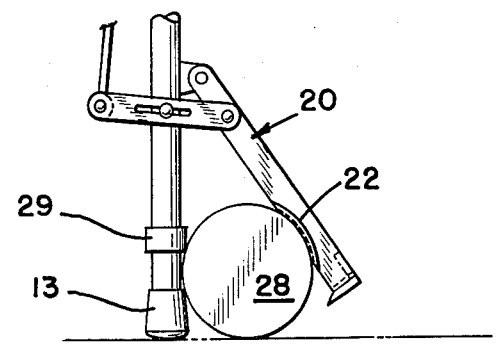
FIG. 5 is a side elevation of the gripping section grasping an object.

Another example of the versatility of the preferred embodiment is shown in FIG. 5 in which a beverage can 28 is shown held by arcuate gripping means 22, frictional engaging means 13 and support ring 29. Support ring 29 is also preferably made of rubber of some other high frictional material.

Various modifications or changes can be made to the examples shown and such modifications are deemed within the scope of the present invention.

I claim:

1. A walking aid for retrieving objects comprising: a handle, said handle being joined to an elongated shaft, said shaft having a support ring and a frictional engaging means, a pull rod, said pull rod being joined to linkage means, said linkage means being connected to an arm member, said arm member being pivotable from an open to a closed position, said arm member including aresilient lip, said lip overlappingly contacting said frictional engaging means when the arm member is in the closed position.

2. A walking aid as claimed in claim 1 wherein said arm member includes arcuate gripping means.

3. A walking aid for retrieving objects comprising: a handle, said handle being joined to an elongated shaft, said shaft having a support ring and a frictional engaging means, a pull rod slidably affixed to said shaft, said pull rod including a finger engaging means, said shaft including a plurality of eyelet means for retaining and guiding said pull rod, said pull rod being pivotally connected to linkage means, said linkage means being joined to an arm member, said arm member being pivotable from an open to a closed position, said arm member including a resilient lip and having a magnetic means, said shaft including a bracket means whereby said magnetic means contacts said bracket means in the open position of said arm member to retain said arm member in a dormant position.

* * * * *